(12) United States Patent
Sun

(10) Patent No.: US 6,947,610 B2
(45) Date of Patent: Sep. 20, 2005

(54) METHOD OF CORRECTING AN IMAGE WITH PERSPECTIVE DISTORTION AND PRODUCING AN ARTIFICIAL IMAGE WITH PERSPECTIVE DISTORTION

(75) Inventor: Hung-Ming Sun, Yunlin Hsien (TW)

(73) Assignee: Ulead Systems Inc., Taipei (TW)

( * ) Notice: Subject to any disclaimer, the term of this patent is extended or adjusted under 35 U.S.C. 154(b) by 602 days.

(21) Appl. No.: 10/085,409

(22) Filed: Mar. 1, 2002

(65) Prior Publication Data

US 2003/0002751 A1 Jan. 2, 2003

(30) Foreign Application Priority Data

Mar. 2, 2001 (TW) ........................................ 90104818 A (51) Int. Cl.⁷ ................................................ G06K 9/32
(52) U.S. Cl. ........................ 382/293; 382/275; 353/69
(58) Field of Search ................................. 382/293, 295, 382/296, 275, 298; 353/69

(56) References Cited

U.S. PATENT DOCUMENTS

| | | | | |
|---|---|---|---|---|
| 5,528,194 A | * | 6/1996 | Ohtani et al. | 382/293 |
| 5,726,716 A | * | 3/1998 | Egashira et al. | 348/580 |
| 5,933,132 A | * | 8/1999 | Marshall et al. | 345/158 |
| 6,324,297 B1 | * | 11/2001 | Uchida | 382/125 |
| 6,361,171 B1 | * | 3/2002 | Ejiri et al. | 353/69 |
| 6,450,647 B1 | * | 9/2002 | Takeuchi | 353/69 |
| 6,511,185 B1 | * | 1/2003 | Gananathan | 353/69 |
| 6,520,647 B2 | * | 2/2003 | Raskar | 353/70 |
| 6,791,616 B2 | * | 9/2004 | Tamaki et al. | 348/335 |

OTHER PUBLICATIONS

Kannappan, IEEE Publication, 1992, " An interleaved scan-line algorithm for 2–D affine transformations of images". (pp. 179–182).*

* cited by examiner

Primary Examiner—Joseph Mancuso
Assistant Examiner—Manav Seth
(74) Attorney, Agent, or Firm—Birch, Stewart, Kolasch & Birch, LLP (57) ABSTRACT

A method of correcting an image with perspective distortion and creating an artificial image with perspective distortion is disclosed. First, image data including a distorted object image are received. Next, the user inputs an operational instruction for setting a plurality of distortion parameters pertaining to the image data, which include a distorted side of the distorted object image, a central line and a distortion ratio. Thus, a plurality of coordinates of corners of the distorted object image are calculated according to these distortion parameters and a transformation matrix is determined according to the calculated coordinates of the corners of the distorted object image. Finally, the distorted object image is transformed to a corrected object image according to the transformation matrix.

5 Claims, 6 Drawing Sheets

METHOD OF CORRECTING AN IMAGE WITH PERSPECTIVE DISTORTION AND PRODUCING AN ARTIFICIAL IMAGE WITH PERSPECTIVE DISTORTION

BACKGROUND OF THE INVENTION

1. Field of the Invention

The present invention is related to an image processing technology, and more specifically, to a method of correcting an image with perspective distortion and producing an artificial image with perspective distortion.

2. Description of the Prior Art

Figure 1A:
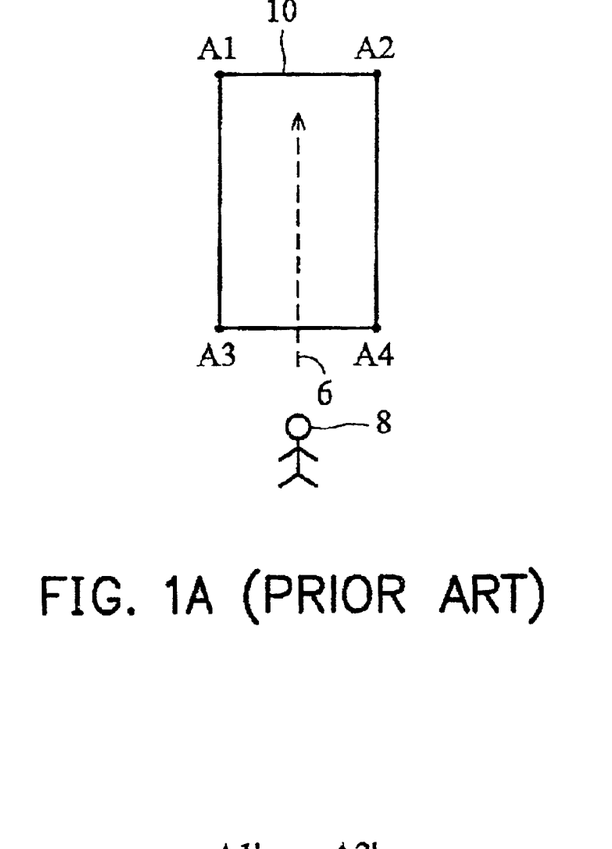
FIG. 1A (Prior Art) is a schematic diagram illustrating an observer and an object.
Figure 1B:
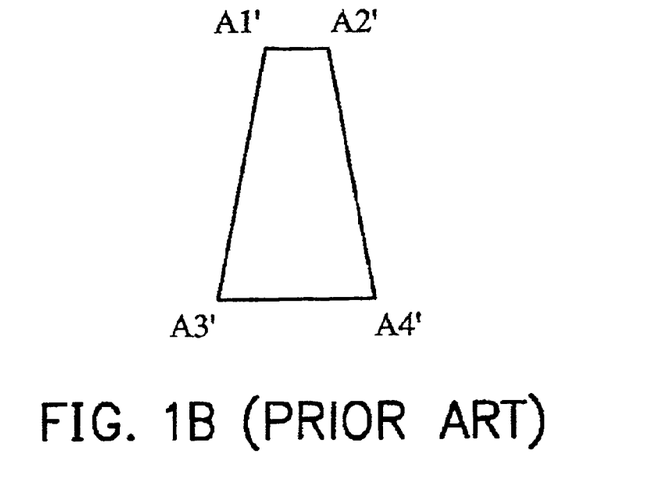
FIG. 1B (Prior Art) is a schematic diagram illustrating an image with perspective distortion.

When an observer observes a physical object, the observed shape of the physical object is usually slightly different from the original one, which is determined by the distance between the observer and the object and the location of the observer. Such deviation is called perspective distortion. FIG. 1A (Prior Art) is a schematic diagram illustrating an observer and an object. FIG. 1B (Prior Art) is a schematic diagram illustrating an image with perspective distortion. As shown in FIG. 1A, the observer 8 observes the object 10 at a lower position, where numeral 6 represents a line of sight of the observer 8. In addition, the four corners of the object 10 are denoted by A1, A2, A3 and A4, respectively. Apparently, a line $\overline{A3A4}$ is close to the observer 8 and a line $\overline{A1A2}$ is distant from the observer 8. Accordingly, the observed lengths of the two lines $\overline{A3A4}$ and $\overline{A1A2}$ are extended and shortened, respectively, as shown in FIG. 1B. In FIG. 1B, the observed corners of the object 10 are denoted by A1', A2', A3' and A4'.

In the image-processing field, the captured image of a physical object usually suffers from the distortion effect and should be corrected. A conventional correction scheme is described as follows. First, the user needs to locate the four corners of a distorted object on an image, which suffers from the perspective distortion effect. For example, as shown in FIG. 1B, the four corners A1', A2', A3' and A4' of the object 10 are determined by the user. Thus, the pixels of the image are transformed and the new coordinates of these pixels are calculated based on a coordinate-transforming matrix. Finally, the perspective distortion effect is corrected.

However, in the conventional scheme, the user must manually locate the corners of the distorted object and thus determine the corresponding transformation matrix, which is inconvenient for the user.

SUMMARY OF THE INVENTION

Therefore, the object of the present invention is to provide a method of processing an image with perspective distortion, which determines the corner coordinates with respect to various distorted sides of a distorted object.

The present invention achieves the above-indicated objects by providing a method of correcting an image with perspective distortion. First, image data including a distorted object image are received. Next, the user inputs an operational instruction for setting a plurality of distortion parameters pertaining to the image data, which include a distorted side of the distorted object image, a central line and a distortion ratio. Thus, a plurality of coordinates of corners of the distorted object image are calculated according to these distortion parameters and a transformation matrix is determined according to the calculated coordinates of the corners of the distorted object image. Finally, the distorted object image is transformed to a corrected object image according to the transformation matrix.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE INVENTION

Figure 2:
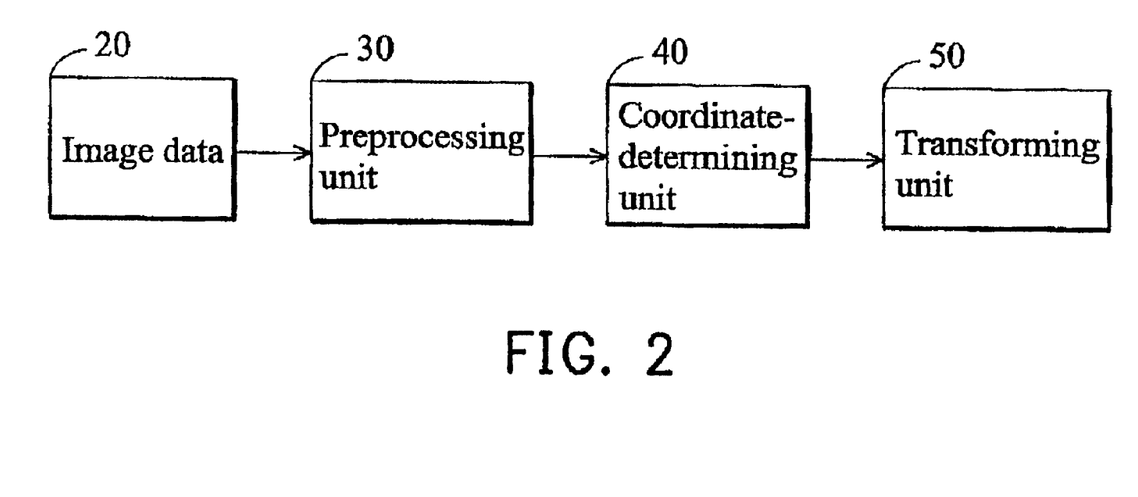
FIG. 2 is a block diagram of processing an image with perspective distortion according to the preferred embodiment of the present invention.

FIG. 2 is a block diagram of processing an image with perspective distortion in the embodiment. Image data 20 shown in FIG. 2 include a distorted object image ready to be processed, such as the distorted object shown in FIG. 1B. Data image 20 are sent to a preprocessing unit 30, which is used to receive the distortion parameters that are required in the correction of perspective distortion. There are three distortion parameters in the preferred embodiment, including a distortion side, a location of a distortion central line and a distortion ratio. The distorted side is denoted by "D" and indicates the distorted side of the distorted object image that is ready to be processed. The distorted side D can be set as TOP, BOTTOM, LEFT and RIGHT, which indicate the top side, the bottom side, the left side and right side of the distorted object image, respectively. The location of the distortion central line is denoted by "C" and will be described later in details. The distortion ratio is denoted by "F" and indicates a ratio of the length of the distorted side and the length of the original side with respect to the distorted side. The distortion ratio is between 0 and 1 (no distortion).

When these distortion parameters are prepared, the image data 20 is sent to a coordinate-determining unit 40 for determining the coordinates of the corners of the distorted object image and a corresponding transformation matrix. Finally, a transforming unit 50 transforms the distorted object image to an undistorted image according to the transformation matrix. It is noted that an artificial image with perspective distortion can also be produced by a similar process. In the preferred embodiment, all distorted sides of the distorted object image can be sequentially processed by setting different sets of the distortion parameters to determine the required transformation matrix.

The following description focuses on the determination of the coordinates of the corners of the distorted object image. As described above, the distortion side D can be set as TOP, BOTTOM, LEFT and RIGHT. The four cases will be described respectively in details.

The Distortion Side D is TOP (D=TOP)

First Example

Figure 3:
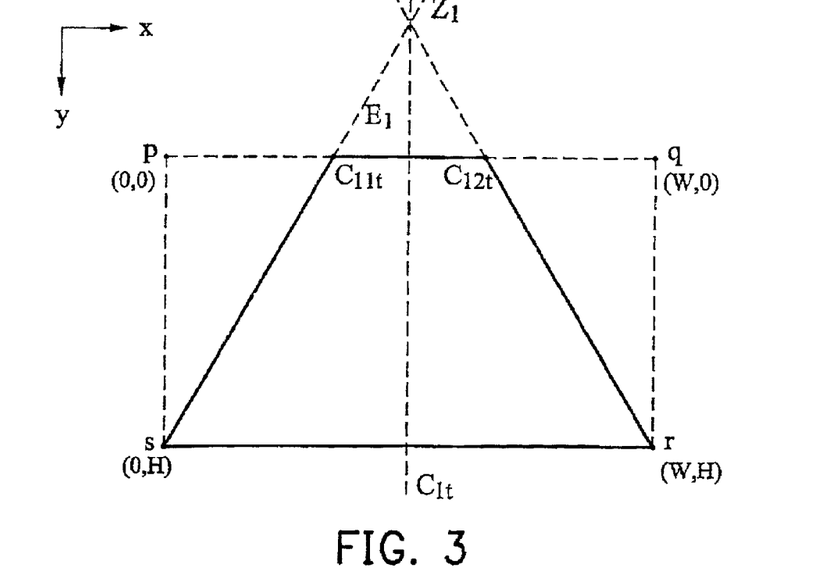
FIG. 3 is a schematic diagram illustrating a first example of the correction of the perspective distortion when the distorted side is a top side according to the preferred embodiment of the present invention.

FIG. 3 is a schematic diagram illustrating a first example when the distorted side is TOP according to the preferred embodiment of the present invention. The four corners of the distorted object image are denoted by s, $C_{11t}$, $C_{12t}$ and r, respectively. The coordinates of the two corners $C_{11t}$ and $C_{12t}$ are undetermined since the distortion side D is a top side. In addition, the two corners s and r and another two points p and q constitute four corners of a rectangle, which is illustrated as dash lines. The coordinates of the four points p, q, r and s are defined as p=(0,0), q=(W,0), r=(W,H) and s=(0,H), where the values W and H are positive numbers. The central line $C_{1t}$ of the present embodiment is determined as follows. The intersection of extensions of the two sides $\overline{sC_{11t}}$ and $\overline{rC_{12t}}$ is defined as a point $Z_1$. Thus, the central line $C_{1t}$ is a line perpendicular to the side $\overline{C_{11t}C_{12t}}$ passing through the point $Z_1$, where the intersection of the central line $C_{1t}$ and the side $\overline{C_{11t}C_{12t}}$ is $E_1$. The first example shown in FIG. 3 illustrates the situation when the central line $C_{1t}$ passes through the inside of the distorted object image.

The coordinates of the corners s, $C_{11t}$, $C_{12t}$ and r are determined by the known distorted side (D=TOP), the central line $C_{1t}$ and the distortion ratio F. As described above, the coordinates of the corners s and r are (0,H) and (W,H), respectively. The coordinates of the corners $C_{11t}$ and $C_{12t}$ are determined as follows.

With respect to the corner $C_{11t}$, its y coordinate is the same as the y coordinates of the points p and q, and its x coordinate is calculated by:

$$C_{11t,x} = x_{1t} - x_{1t} \times F \quad (1)$$

where $x_{1t}$ represents the x coordinate of the central line $C_{1t}$. The complete coordinates of the corner $C_{11t}$ are obtained.

With respect to the corner $C_{12t}$, its y coordinate is the same as the y coordinates of the points p and q, and its x coordinate is acquired by using the relationship of the similar triangles shown in FIG. 3.

$$\frac{\overline{pC_{11t}}}{\overline{C_{11t}E_1}} = \frac{\overline{C_{11t}s}}{\overline{C_{11t}Z_1}} = \frac{\overline{C_{12t}r}}{\overline{C_{12t}Z_1}} = \frac{\overline{qC_{12t}}}{\overline{C_{12t}E_1}} \quad (2)$$

According to equations (1) and (2), the x coordinate of the corner $C_{12t}$ is calculated by:

$$C_{12t,x} = x_{it} + \overline{qE_1} \times F \quad (3)$$
$$= x_{1t} + (W - x_{1t}) \times F$$

where $x_{1t}$ represents the x coordinate of the central line $C_{1t}$. The complete coordinates of the corner $C_{12t}$ are obtained.

Therefore, the complete coordinates of the four corners r, $C_{11t}$, $C_{12t}$ and s of the distorted object image are obtained in the first example.

Second Example

Figure 4:
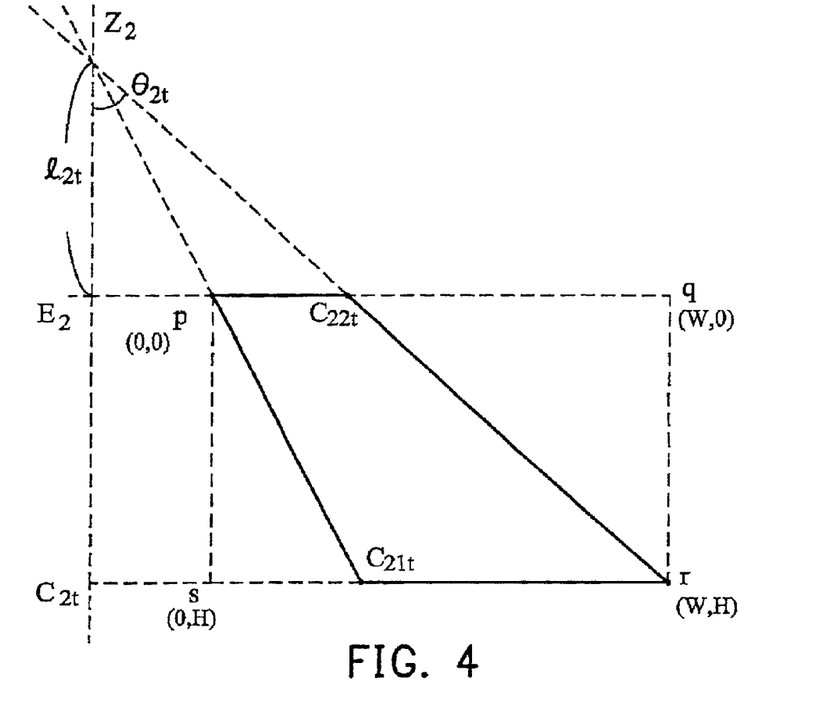
FIG. 4 is a schematic diagram illustrating a second example of the correction of the perspective distortion when the distorted side is a top side according to the preferred embodiment of the present invention.

FIG. 4 is a schematic diagram illustrating a second example when the distorted side is TOP according to the preferred embodiment of the present invention. The four corners of the distorted object image are denoted by p, $C_{22t}$, r and $C_{21t}$, respectively. The coordinates of the two corners $C_{22t}$ and $C_{21t}$ are undetermined. In addition, the two corners p and r and another two points q and s constitute four corners of a rectangle, which is illustrated as dash lines. The coordinates of these corners of the rectangular can be defined as p=(0,0), q=(W,0), r=(W,H) and s=(0,H), which are the same as those in the first example. In the second example, the central line $C_{2t}$ is located at the left of the distorted object image and determined as follows. The intersection of extensions of the two sides $\overline{C_{21t}p}$ and $\overline{rC_{22t}}$ is defined as a point $Z_2$. Thus, the central line $C_{2t}$ is a line perpendicular to an extension of the side $\overline{C_{22t}p}$ passing through the point $Z_2$, where the intersection of the central line $C_{2t}$ and the extension of the side $\overline{C_{22t}p}$ is $E_2$. In addition, the length of the line segment $\overline{E_2Z_2}$ is denoted by $l_{2t}$.

The coordinates of the corners p, $C_{22t}$, r and $C_{21t}$ are determined by the known distorted side (D=TOP), the central line $C_{2t}$ and the distortion ratio F. As described above, the coordinates of the corners p and r are (0,0) and (W,H), respectively. The coordinates of the corners $C_{21t}$ and $C_{22t}$ are determined as follows.

With respect to the corner $C_{22t}$, its y coordinate is the same as the y coordinate of the point p (that is, 0), and its x coordinate is calculated by:

$$C_{22t,x} = x_{2t} + (W + x_{2t}) \times F \quad (4)$$

where $x_{2t}$ is a negative number and represents the x coordinate of the central line $C_{2t}$. The complete coordinates of the corner $C_{22t}$ are obtained.

With respect to the corner $C_{21t}$, its y coordinate is the same as the y coordinate of the point s (that is, H), and its x coordinate is calculated as follows. The angle of an extension of the side $\overline{rC_{22t}}$ and the central line $C_{2t}$ is defined as $\theta_{2t}$. In addition, the angle of the line segments $\overline{rq}$ and $\overline{rC_{22t}}$ is also $\theta_{2t}$. According to FIG. 4, $$\tan\theta_{2t} = \frac{\overline{C_{22t}q}}{\overline{rq}} = \frac{W - C_{22t,x}}{H}$$

Thus, the angle $\theta_{2t}$ is obtained by the following equation:

$$\theta_{2t} = \tan^{-1}\left(\frac{W - C_{22t,x}}{H}\right) \quad (5)$$

In addition, the length $l_{2t}$ is obtained by the following equation:

$$\ell_{2t} = \overline{C_{22t}E_2}\cot\theta_{2t} \quad (6)$$
$$= [|x_{2t}| + W - (W - C_{22t,x})]\cot\theta_{2t}$$
$$= (C_{22t,x} - x_{2t})\cot\theta_{2t}$$

where $x_{2t}$ represents the x coordinate of the central line $C_{2t}$. In addition, since triangles $Z_2E_2p$ and $psC_{21t}$ are similar, the following equation is satisfied.

$$\frac{\ell_{2t}}{|x_{2t}|} = \frac{\overline{ps}}{\overline{C_{21t,x}}} \qquad (7)$$

The x coordinate of the corner $C_{21t}$ can be determined by equations (5), (6) and (7).

$$C_{21t,x} = |x_{2t}| \times H/[(C_{22t,x} - x_{2t}) \cot \theta_{2t}] \qquad (8)$$

Accordingly, the complete coordinates of the corner $C_{22t}$ are obtained by equation (4) and the complete coordinates of the corner $C_{21t}$ are obtained by equation (8).

Third Example

Figure 5:
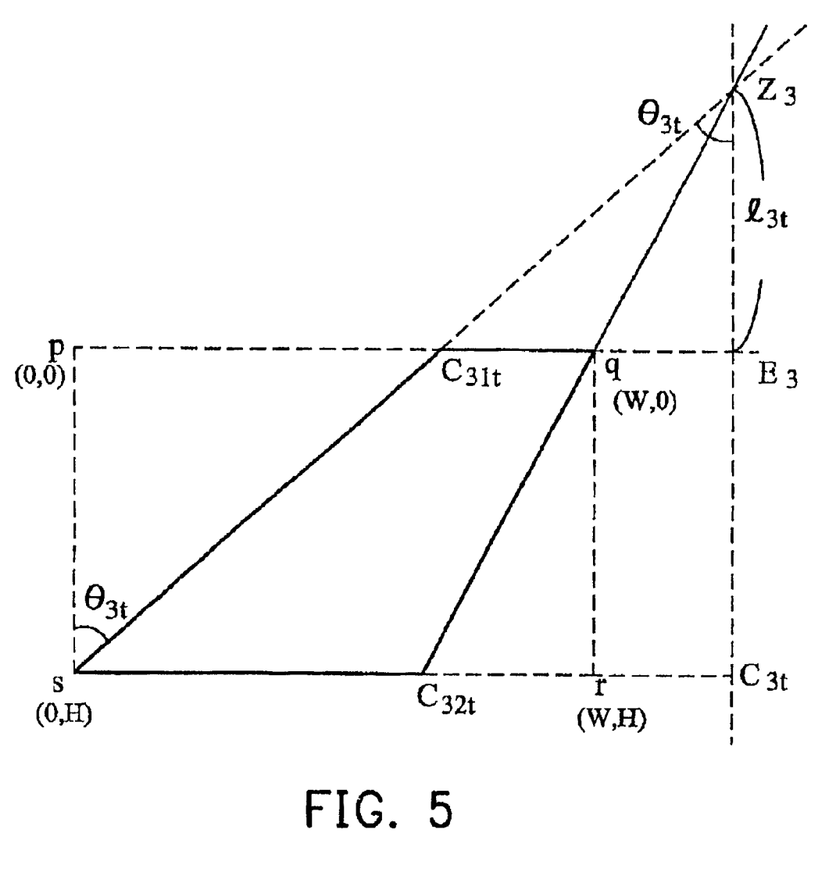
FIG. 5 is a schematic diagram illustrating a first example of the correction of the perspective distortion when the distorted side is a top side according to the preferred embodiment of the present invention.

FIG. 5 is a schematic diagram illustrating a third example when the distorted side is TOP according to the preferred embodiment of the present invention. The four corners of the distorted object image are denoted by $C_{31t}$, q, $C_{32t}$ and s, respectively. The coordinates of the two corners $C_{31t}$ and $C_{32t}$ are undetermined. In addition, the two corners q and s and another two points p and r constitute a rectangle, which is illustrated as dash lines. The coordinates of these corners of the rectangular can be defined as p=(0,0), q=(W, 0), r=(W,H) and s=(0,H), which are the same as those in the first example. In the third example, the central line $C_{3t}$ is located at the right of the distorted object image and determined as follows. The intersection of extensions of the two sides $\overline{sC_{31t}}$ and $\overline{C_{32t}p}$ is defined as a point $Z_3$. Thus, the central line $C_{3t}$ is a line perpendicular to an extension of the side $\overline{C_{31t}q}$ passing through the point $Z_3$, where the intersection of the central line $C_{2t}$ and the extension of the side $\overline{C_{31t}q}$ is $E_3$. In addition, the length of the line segment $\overline{E_3Z_3}$ is denoted by $l_{3t}$.

The coordinates of the corners $C_{31t}$, q, $C_{32t}$ and s are determined by the known distorted side (D=TOP), the central line $C_{3t}$ and the distortion ratio F. As described above, the coordinates of the corners q and s are (W, 0) and (0,H), respectively. The coordinates of the corners $C_{31t}$ and $C_{32t}$ are determined as follows.

With respect to the corner $C_{31t}$, its y coordinate is the same as the y coordinate of the point q (that is, 0), and its x coordinate is calculated by:

$$C_{31t,x} = x_{3t} - x_{3t} \times F \qquad (9)$$

where $x_{3t}$ represents the x coordinate of the central line $C_{3t}$. The complete coordinates of the corner $C_{31t}$ are obtained.

With respect to the corner $C_{32t}$, its y coordinate is the same as the y coordinate of the point s (that is, H), and its x coordinate is calculated as follows. The angle of an extension of the side $\overline{sC_{31t}}$ and the central line $C_{3t}$ is defined as $\theta_{3t}$. In addition, the angle of the line segments $\overline{sp}$ and $\overline{pC_{31t}}$ is also $\theta_{3t}$. As shown in FIG. 5, $$\tan \theta_{3t} = \frac{\overline{pC_{31t}}}{\overline{sp}} = \frac{C_{31t,x}}{H}$$

Thus, the angle $\theta_{3t}$ is obtained by the following equation:

$$\theta_{3t} = \tan^{-1}\left(\frac{C_{31t,x}}{H}\right) \qquad (10)$$

In addition, the length $l_{3t}$ is obtained by the following equation:

$$\ell_{3t} = \overline{E_3C_{31t}} \cot \theta_{3t} \qquad (11)$$
$$= (x_{3t} - C_{31t,x}) \cot \theta_{3t}$$
$$= x_{3t} \times F \times \cot \theta_{3t}$$

Since triangles $Z_3E_3q$ and $qrC_{32t}$ are similar, the following equation is satisfied.

$$\frac{\overline{rC_{32t}}}{\overline{qr}} = \frac{\overline{E_3q}}{\ell_{3t}} \qquad (12)$$

The x coordinate of the corner $C_{32t}$ can be determined by equations (10), (11) and (12).

$$C_{32t,x} = W - \overline{rC_{32t}} \qquad (13)$$
$$= W - \frac{H \times (x_{3t} - W)}{x_{3t} \times F \times \cot \theta_{3t}}$$

Accordingly, the complete coordinates of the corner $C_{31t}$ are obtained by equation (9) and the complete coordinates of the corner $C_{32t}$ are obtained by equation (13).

According to the three examples described above, the coordinates of the corners of the distorted object image can be determined by the known distortion parameters when the distortion side is a top side. Subsequently, a new transformation matrix can be obtained and the distorted object image is transformed by means of the transformation matrix.
The Distortion Side D is BOTTOM (D=BOTTOM)

Figure 6:
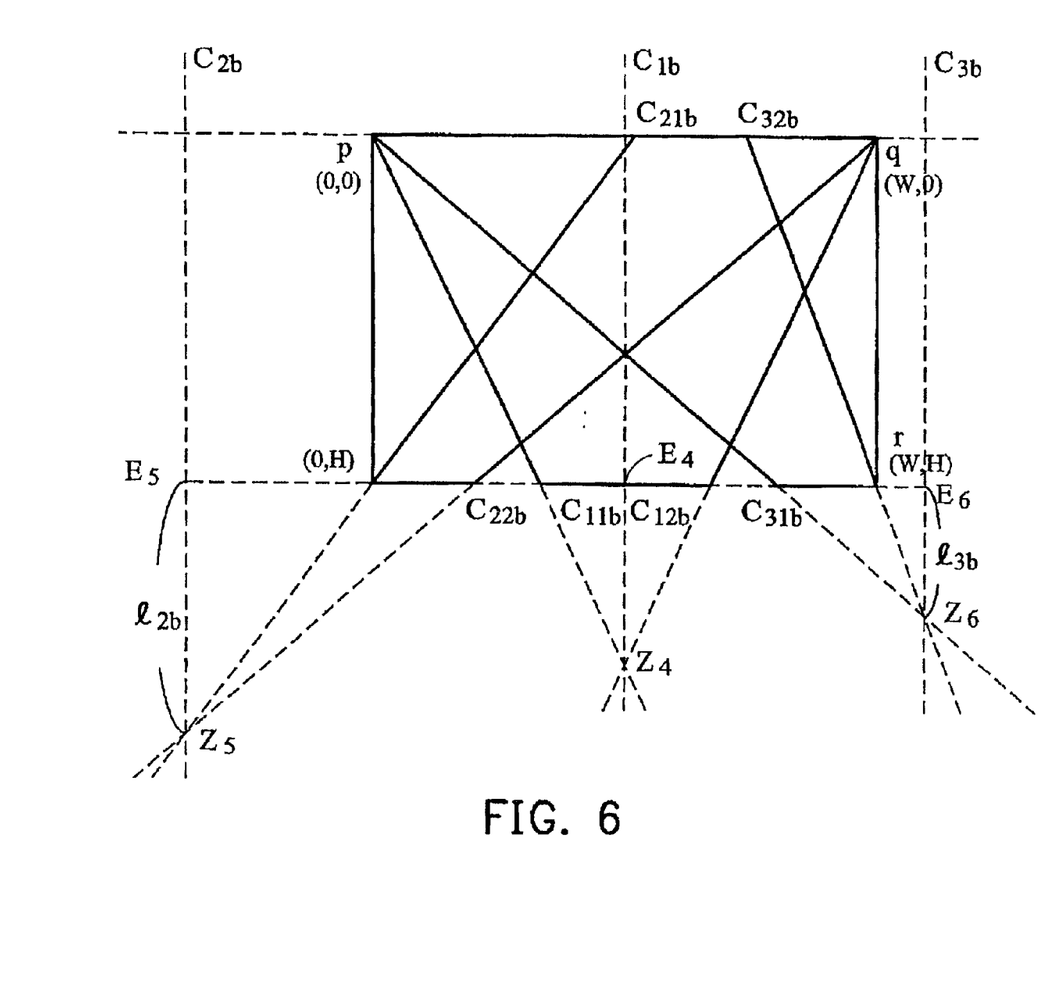
FIG. 6 is a schematic diagram illustrating the determination of the corner coordinates of the distorted object image with a distorted bottom side according to the preferred embodiment of the present invention.

FIG. 6 is a schematic diagram illustrating the determination of the corner coordinates of the distorted object image with a distorted bottom side according to the preferred embodiment of the present invention. In addition, FIG. 6 shows three different central lines $C_{1b}$ (passing through the inside of the distorted object image), $C_{2b}$ (locating at the left of the distorted object image) and $C_{3b}$ (locating at the right of the distorted object image), which correspond to three examples in this case.

In the first example, the central line is denoted by $C_{1b}$. The four corners of the distorted object image are denoted by p, q, $C_{11b}$ and $C_{12b}$, respectively. The coordinates of the two corners $C_{11b}$ and $C_{12b}$ are undetermined. In addition, the other corners p and q and two points r and s constitute four corners of a rectangle, which is illustrated as dash lines, where p=(0,0), q=(W,0), r=(W,H) and s=(0,H). The central line $C_{1b}$ is determined by the intersection $Z_4$ of extensions of the two sides $\overline{pC_{11b}}$ and $\overline{qC_{12b}}$. The central line $C_{1b}$ is a line perpendicular to the side $\overline{C_{11b}C_{12b}}$ passing through the point $Z_4$, where the intersection of the central line $C_{1b}$ and the side $\overline{C_{11b}C_{12b}}$ is $E_4$.

The coordinates of the corners p, q, $C_{11b}$ and $C_{12b}$ are determined by the known distorted side (D=BOTTOM), the central line $C_{1b}$ and the distortion ratio F. As described above, the coordinates of the corners p and g are (0,0) and (W,0), respectively. The coordinates of the corners $C_{11b}$ and $C_{12b}$ are determined as follows.

With respect to the corner $C_{11b}$, its y coordinate is the same as the y coordinates of the points s and r, and its x coordinate is calculated by:

$$C_{11b,x} = x_{1b} - x_{1b} \times F \qquad (14)$$

where $x_{1b}$ represents the x coordinate of the central line $C_{1b}$. The complete coordinates of the corner $C_{11b}$ are obtained.

With respect to the corner $C_{12b}$, its y coordinate is the same as the y coordinates of the points s and r. According to FIG. 6, the following equation is satisfied:

$$\frac{\overline{sC_{11b}}}{\overline{C_{11b}E_4}} = \frac{\overline{C_{11b}p}}{\overline{C_{11b}Z_4}} = \frac{\overline{C_{12b}q}}{\overline{C_{12b}Z_4}} = \frac{\overline{rC_{12b}}}{\overline{C_{12b}E_4}} \quad (15)$$

According to equations (14) and (15), the x coordinate of the corner $C_{12b}$ is calculated by:

$$C_{12b,x} = x_{1b} + \overline{rE_4} \times F \quad (16)$$
$$= x_{1b} + (W - x_{1b}) \times F$$

where $x_{1b}$ represents the x coordinate of the central line $C_{1b}$. The complete coordinates of the corner $C_{12b}$ are obtained by equation (16).

The determination of the corner coordinates in the second example, in which the central line is located at the left of the distorted object image, and the third example, in which the central line is located at the right of the distortion object image are similar to those in the first embodiment.

Accordingly, the coordinates of the corners of the distorted object image can be determined by the known distortion parameters when the distortion side is a BOTTOM side. Subsequently, a new transformation matrix can be obtained and the distorted object image is transformed by means of the transformation matrix.

The Distortion Side D is LEFT (D=LEFT)

Figure 7:
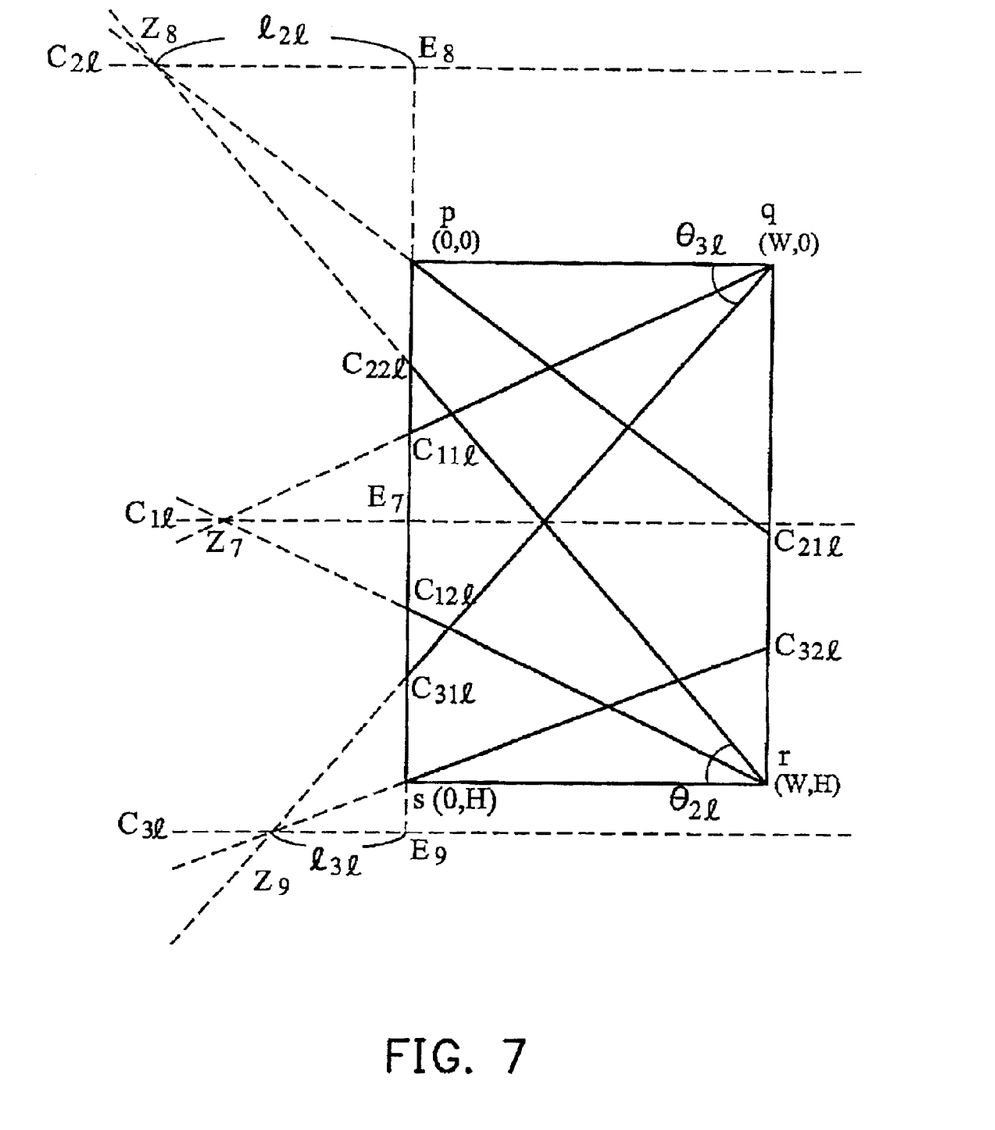
FIG. 7 is a schematic diagram illustrating the determination of the corner coordinates of the distorted object image with a distorted left side according to the preferred embodiment of the present invention.

FIG. 7 is a schematic diagram illustrating the determination of the corner coordinates of the distorted object image with a distorted left side according to the preferred embodiment of the present invention. FIG. 7 shows three different central lines $C_{1l}$ (passing through the inside of the distorted object image), $C_{2l}$ (locating above the distorted object image) and $C_{3l}$ (locating below the distorted object image), which correspond to three examples in this situation.

First Example

The central line in the first example is denoted by $C_{1l}$. The four corners of the distorted object image are denoted by q, r, $C_{12l}$ and $C_{11l}$, respectively, where the coordinates of $C_{12l}$ and $C_{11l}$ are undetermined. In addition, the two corners s and r and another two points p and q constitute four corners of a rectangle, where p=(0,0), q=(W,0), r=(W,H) and s=(0,H). The central line $C_{1l}$ is determined by the intersection $Z_7$ of extensions of the two sides $\overline{qC_{111}}$ and $\overline{rC_{121}}$. Thus, the central line $C_{1l}$ is a line perpendicular to the side $\overline{C_{111}C_{121}}$ passing through the point $Z_7$, where the intersection of the central line $C_{1l}$ and the side $\overline{C_{111}C_{121}}$ is $E_7$.

The coordinates of the corners q, r, $C_{12l}$ and $C_{11l}$ are determined by the known distorted side (D=LEFT), the central line $C_{1l}$ and the distortion ratio F. As described above, the coordinates of the corners q and r are (W,0) and (W,H), respectively. The coordinates of the corners $C_{11l}$ and $C_{12l}$ are determined as follows.

With respect to the corner $C_{11l}$, its x coordinate is the same as the x coordinates of the points p and s, and its y coordinate is calculated by:

$$C_{11l,y} = y_{1l} - y_{1l} \times F \quad (17)$$

where $y_{1l}$ represents the y coordinate of the central line $C_{1l}$. The complete coordinates of the corner $C_{11l}$ are obtained.

With respect to the corner $C_{12l}$, its x coordinate is the same as the x coordinates of the points p and s, and its x coordinate is acquired by using the relationship of the similar triangles, which is similar to that in the case of D=TOP.

$$C_{12l,y} = y_{1l} + \overline{sE_7} \times F \quad (18)$$
$$= y_{1l} + (H - y_{1l}) \times F$$

where $y_{1l}$ represents the y coordinate of the central line $C_{1l}$. The complete coordinates of the corner $C_{12l}$ are obtained.

Therefore, the complete coordinates of the corner $C_{11l}$ are obtained by equation (17) and the complete coordinates of the corner $C_{12l}$ are obtained by equation (18).

Second Example

The central line in the first example is denoted by $C_{2l}$ and located above the distorted object image. The four corners of the distorted object image are denoted by p, $C_{21l}$, r and $C_{22l}$, respectively, where the coordinates of the two corners $C_{21l}$ and $C_{22l}$ are undetermined. The central line $C_{2l}$ is determined by the intersection $Z_8$ of extensions of the two sides $\overline{C_{211}p}$ and $\overline{rC_{221}}$. Thus, the central line $C_{2l}$ is a line perpendicular to an extension of the side $\overline{C_{221}p}$ passing through the point $Z_8$, where the intersection of the central line $C_{2l}$ and the extension of the side $\overline{C_{221}p}$ is $E_8$. In addition, the length of the line segment $\overline{E_8Z_8}$ is denoted by $l_{2l}$.

With respect to the corner $C_{22l}$, its x coordinate is the same as the x coordinate of the point p (that is, 0) and its y coordinate is calculated by:

$$C_{22l,y} = y_{2l} + (H - y_{2l}) \times F \quad (19)$$

where $y_{2l}$ is a negative number and represents the y coordinate of the central line $C_{2l}$.

With respect to the corner $C_{21l}$, its x coordinate is the same as the x coordinate of the point r (that is, W), and its y coordinate is calculated by the same method shown in FIG. 4.

$$C_{21l,y} = |y_{2l}| \times W / [(C_{22l,y} - y_{2l}) \cot \theta_{2l}] \quad (20)$$

where $y_{2l}$ represents the y coordinate of the central line $C_{2l}$ and $\theta_{2l}$ is an angle of the line segments $\overline{rC_{221}}$ and $\overline{rs}$. Accordingly, the complete coordinates of the corner $C_{22l}$ are obtained by equation (19) and the complete coordinates of the corner $C_{21l}$ are obtained by equation (20).

Third Example

The central line in the first example is denoted by $C_{3l}$ and located below the distorted object image. The four corners of the distorted object image are denoted by q, $C_{32l}$, s and $C_{31l}$ respectively, where the coordinates of the two corners $C_{32l}$ and $C_{31l}$ are undetermined. The central line $C_{3l}$ is determined by the intersection $Z_9$ of extensions of the two sides $\overline{C_{321}s}$ and $\overline{qC_{311}}$. Thus, the central line $C_{3l}$ is a line perpendicular to an extension of the side $\overline{C_{311}s}$ passing through the point $Z_9$, where the intersection of the central line $C_{3l}$ and the extension of the side $\overline{C_{311}s}$ is $E_9$. In addition, the length of the line segment $\overline{E_9Z_9}$ is denoted by $l_{3l}$.

With respect to the corner $C_{31l}$, its x coordinate is the same as the x coordinate of the point s (that is, 0), and its y coordinate is calculated by:

$$C_{31l,y} = y_{3l} - y_{3l} \times F \quad (21)$$

where $y_{3l}$ represents the y coordinate of the central line $C_{3l}$.

With respect to the corner $C_{32l}$, its x coordinate is the same as the x coordinate of the point q (that is, W), and its y coordinate is calculated by the same method shown in FIG. 5.

$$C_{32l,y} = H - \overline{rC_{32l}} \quad (22)$$

$$= H - \frac{W \times (y_{3l} - H)}{y_{3l} \times F \times \cot\theta_{3l}}$$

where $y_{3l}$ represents the y coordinate of the central line $C_{3l}$ and $\theta_{3l}$ is an angle of the line segments $\overline{qC_{311}}$ and $\overline{qp}$. Accordingly, the complete coordinates of the corner $C_{31l}$ are obtained by equation (21) and the complete coordinates of the corner $C_{32l}$ are obtained by equation (22)

According to the three examples described above, the coordinates of the corners of the distorted object image can be determined by the known distortion parameters when the distortion side is the left side of the distorted object image. Subsequently, a new transformation matrix can be obtained and the distorted object image is transformed by means of the transformation matrix.

The Distortion Side D is LEFT (D=LEFT)

The process of the determination of the corner coordinates of the distorted object image in this case, in which the distortion side is a left side of the distorted object image, is similar to those in the above cases and will not be described again.

It is noted that the above-described process also can be applied to produce an artificial image with perspective distortion, where the original object image is undistorted.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of correcting an image with perspective distortion, comprising the steps of:

receiving image data including a distorted object image, wherein the distorted object image is perspective from a projection plane;

setting distortion parameters pertaining to the image data according to an operational instruction, wherein the distortion parameters comprise a distortion central line perpendicular to the projection plane and passing through a coverage point of any set of parallel lines that are not parallel to the projection plane;

calculating a plurality of coordinates of corners of the distorted object image according to the distortion parameters;

determining a transformation matrix according to the calculated coordinates of the corners of the distorted object image; and transforming the distorted object image to a corrected object image according to the transformation matrix.

2. The method of claim 1, wherein the distortion parameter includes a distortion ratio of a distorted side of the distorted object image.

3. The method of claim 1, wherein the coordinates of the corners of the corrected object image are calculated according to the location of the distortion central line of the distorted object image.

4. The method of claim 1, wherein the distortion parameter includes a distorted side of the distorted object image, a distortion ratio of the distorted side of the distorted object image and a location of a distortion central line of the distorted object image.

5. A method of determining coordinates of corners of a distorted object image on an image with perspective distortion, comprising the steps of:

determining a distorted side of the distorted object image, wherein the distorted object image is perspective from a projection plane;

determining a location of a distortion central line of the distorted object image with respect to the distorted side and a distortion ratio of the distorted object image with respect to the distorted side, wherein the distortion central line is perpendicular to the projection plane and passes through a coverage point of any set of parallel lines that are not parallel to the projection plane; and calculating the coordinates of the corners of the distorted object image according to the distorted side, the location of the distortion central line and the distortion ratio.

* * * * *